United States Patent [19]

Braun et al.

[11] Patent Number: 4,979,556
[45] Date of Patent: Dec. 25, 1990

[54] THICKNESS CONTROL FOR A CONTINUOUS CASTER

[75] Inventors: Curt Braun; Subbiah Sankaran, both of Riverside, Calif.

[73] Assignee: Hunter Engineering Company, Inc., Riverside, Calif.

[21] Appl. No.: 333,298

[22] Filed: Apr. 4, 1989

[51] Int. Cl.[5] .............................................. B22D 11/06
[52] U.S. Cl. .................................... 164/452; 164/428; 164/154
[58] Field of Search ................ 164/154, 428, 452, 480

[56] References Cited

U.S. PATENT DOCUMENTS

| | | |
|---|---|---|
| 2,332,289 | 10/1943 | Zeitlin . |
| 3,401,547 | 9/1968 | Hall et al. . |
| 3,404,551 | 10/1968 | Spisak . |
| 3,537,285 | 11/1970 | Kiggell et al. . |
| 3,570,288 | 3/1971 | Fischer et al. . |
| 3,573,472 | 4/1971 | Madalo . |
| 3,640,109 | 2/1972 | Ashton et al. . |
| 3,857,638 | 12/1974 | Bory ............................ 356/400 |
| 3,943,728 | 3/1976 | Ramsey, Jr. . |
| 3,979,935 | 9/1976 | Edwards et al. . |
| 4,021,119 | 5/1977 | Stauffer ........................ 356/375 |
| 4,326,804 | 4/1982 | Mossey ......................... 356/375 |
| 4,440,012 | 4/1984 | Feldmann et al. . |
| 4,456,378 | 6/1984 | Goldowski et al. . |
| 4,519,233 | 5/1985 | Feldmann et al. . |
| 4,548,503 | 10/1985 | Liesch et al. . |
| 4,649,986 | 3/1987 | Frischknecht et al. ............ 164/480 |
| 4,678,023 | 7/1987 | Knapp et al. . |
| 4,821,544 | 4/1989 | Tamler et al. ..................... 72/35 |
| 4,831,854 | 5/1989 | Bald et al. ....................... 72/21 |

FOREIGN PATENT DOCUMENTS

| | | | |
|---|---|---|---|
| 77950 | 5/1983 | European Pat. Off. ............ 164/452 |
| 23543 | 2/1983 | Japan .................... 164/452 |
| 148059 | 7/1987 | Japan .................... 164/452 |
| 156050 | 7/1987 | Japan .................... 164/452 |
| 782899 | 12/1980 | U.S.S.R. .................. 72/37 |
| 1046004 | 10/1983 | U.S.S.R. .................. 164/452 |

Primary Examiner—Richard K. Seidel
Assistant Examiner—Edward A. Brown
Attorney, Agent, or Firm—Christie, Parker & Hale

[57] ABSTRACT

Thickness of metal sheet being cast is continuously controlled by passing a light beam through the gap between the casting machine rolls and measuring the amount of light passing through. The width of the gap is controlled in response to the measured light. To prevent interference in the hostile environment of a casting machine, the light is transmitted along an enclosed path and air is blown through the enclosed path into the roll gap. Both the thickness can be controlled in this way, and the profile can be controlled by axially shifting at least one of a pair of non-cylindrical work rolls.

19 Claims, 3 Drawing Sheets

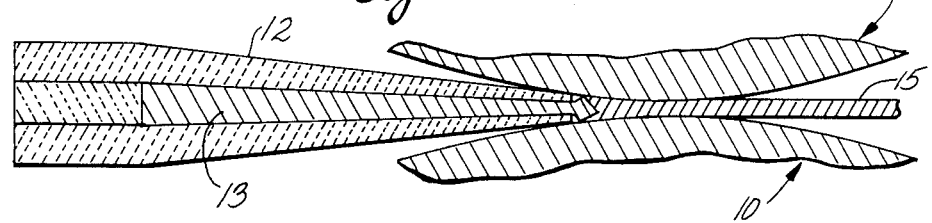
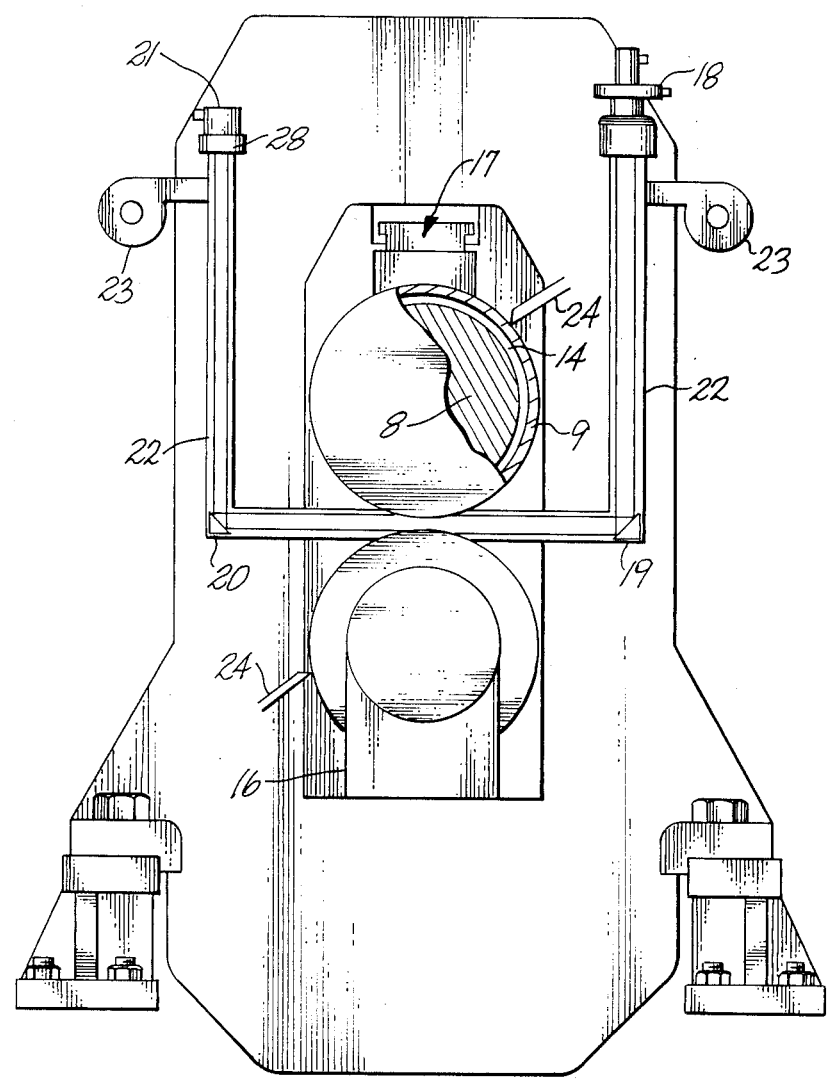

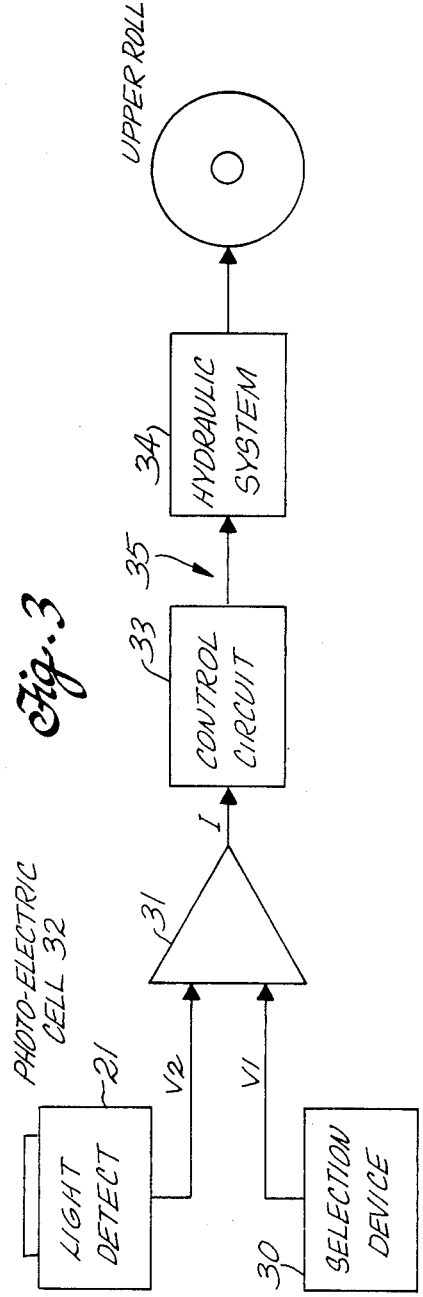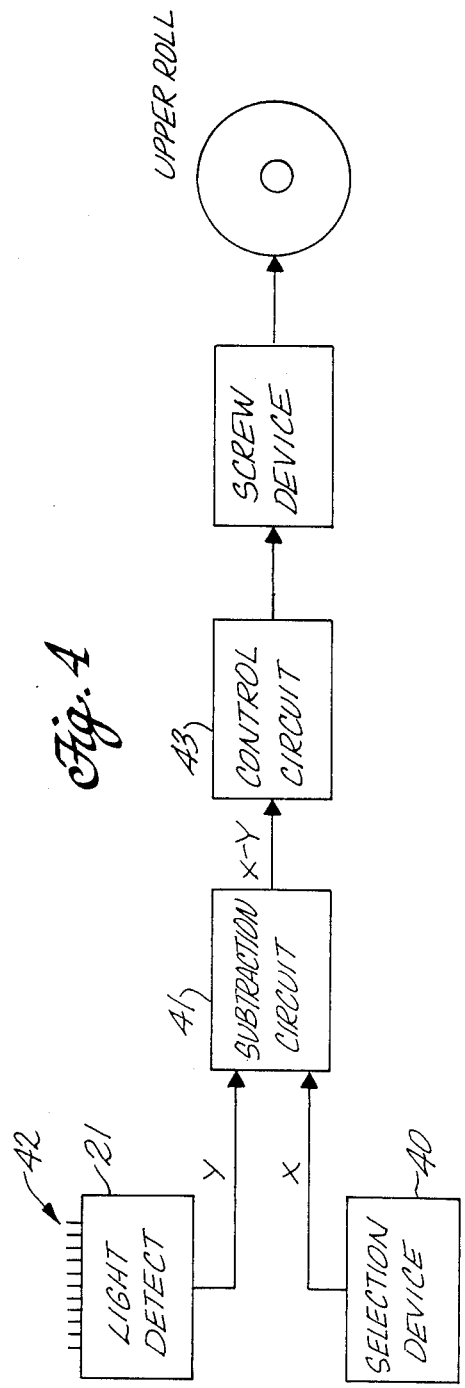

THICKNESS CONTROL FOR A CONTINUOUS CASTER

FIELD OF THE INVENTION

This invention relates to measurement and control of the gap between the rolls of a machine for continuously casting molten metal into a sheet. It is important to be able to control the gap between the casting rolls, since that controls the thickness of the sheet.

BACKGROUND OF THE INVENTION

Casting of metals has long been done by the use of a continuous caster such as that shown in U.S. Pat. Nos. 2,790,216; 4,054,173; or 4,303,181. These patents are incorporated herein by this reference. Such a continuous caster comprises a pair of rotating water cooled rolls. Molten metal is fed into the bite of the rolls just prior to the line of closest approach of the two rolls. Heat is rapidly extracted from the metal, which results in the metal freezing. The caster rolls form a rotating mold for the metal. The frozen metal then continues through the gap between the rolls for hot working the metal. It is important to be able to control the gap between the casting rolls, since that controls the thickness of the casting.

There are important considerations in continuous casting of metal which are not present in mere rolling of metal. The location of the point where the last o the molten metal freezes has an influence on the properties of the sheet of metal cast in the roll caster. If the metal freezes early, that is, with a relatively thicker cross section, there is more hot reduction of the solid metal. This is seen in the separating force between the rolls and in the torque on the motors which rotate the rolls. The increased separating force elastically deforms the mill frame and increases the separation between the rolls, leading to thicker metal cast. Conversely, if the metal freezes relatively late, there is concomitantly less deformation of the metal after freezing and less grain refinement.

Thus, it is desirable to maintain the locus of freezing of the metal in a relatively constant position between the rolls. The locus of freezing is strongly influenced by roll speed as well as roll gap. Slowly rotating rolls leave the metal in contact with the rolls longer, causing freezing a greater distance from the nip, and faster rotational speeds may leave metal unfrozen as it passes through the nip, a severe problem. The roll speed therefore affects sheet quality as well as production rate.

Either or both of the rolls in a roll caster may be slightly eccentric in the bearings so that the gap between the rolls periodically varies as the eccentricities engage the metal being cast. This leads to an undulating thickness in the cast sheet. This can be seen in variations in separating force or roll motor torque, as well. This may be a particular problem in roll casting machines because of the way the rolls are formed.

Typically, the rolls are in the form of a central core with water cooling passages around its perimeter. A relatively thin shell of steel is heat shrunk onto the core to form the surface that contacts the metal being cast. The shell is carefully ground to be concentric with its bearings. However, as the roll is used, the shell may creep around the core so that its outer surface is no longer concentric with the bearings.

In one type of casting machine, the "profile" or cross section of the sheet being cast may be controlled by axially shifting one of the rolls. In such a machine, each of the rolls is non-cylindrical with a slight S-shaped profile complementary to the profile of the other roll. When one of the rolls is shifted axially, the sheet may be cast with a slight crown for guidance in subsequent rolling operations, or may be cast without a crown for subsequent rolling into foil, for example.

In such an embodiment, thickness measurement on the chocks or roll necks may not indicate minor changes in thickness occurring as a result of roll shifting. Further, mechanical arrangements for measuring thickness do not fit well on such a casting machine.

Most prior techniques for controlling a continuous roll caster have relied on measurements of thickness of the finished sheet, and can therefore maintain a general thickness tolerance without being able to control the undulations in thickness which may occur due to roll eccentricities and non-uniform position of the locus of freezing. This is due to measurement of sheet thickness at a location "downstream" from the rolls where the metal is frozen and hot worked. Such a locus of measurement inherently has a time lag so that corrections of metal thickness are made after the errors may have persisted for a period. This leads to non-uniformities in sheet thickness which are undesirable.

A system for controlling the roll gap in a casting machine is described in U.S. Pat. No. 4,678,023 to Knapp. This method directly measures the gage of the casting. The disclosure indicates that this can be done by sending X-ray or Beta ray signals through the casting itself, and then measuring the strength of the remaining signal. However, the Knapp method is dependent on the composition of the metal being cast. Any change in the composition changes the absorption properties of the metal. This requires that new reference values be determined to correspond to that particular composition.

In addition, there is an inescapable time delay when measuring the metal some distance from the rolls. What is actually being measured is the gap that used to be between the rolls. Since constant changes in the position of the rolls is possible, this time delay greatly reduces the effectiveness of a monitor which measures the metal directly. Clearly, other methods of directly measuring the casting itself also suffer from such disadvantages.

Techniques used for measuring the roll spacing in rolling mills are not necessarily suitable for measuring the gap between the rolls in a casting machine. For example, a common instrument for measuring the roll spacing in a rolling mill employs what are effectively mechanical calipers engaging a measurement band on the roll necks concentric with the roll surfaces. As has been mentioned, the rolls in a caster may not remain concentric. Further, the space required for these mechanical devices prohibits usage for measuring the roll gap directly in a casting machine. This is particularly true in a machine with axial shifting of the rolls.

It is desirable to provide a technique which directly monitors the thickness of the metal while still between the casting rolls and is independent of the properties of the metal being cast. It is also desirable to remove the monitoring equipment from the immediate area of the casting rolls to protect it from the hostile environment which often results there.

It is also desirable to measure metal thickness while between the rolls at the same time measurements are made of separating force and/or roll torque. It is desirable to be able to control roll gap in real time along with roll speed.

SUMMARY OF THE INVENTION

There is, therefore, provided in practice of this invention, according to a presently preferred embodiment, a continuous caster which can directly measure and control the gap between the caster rolls in real time. The invention comprises a source capable of transmitting a collimated beam of light into the gap between the caster rolls and a receiver capable of measuring the size of the beam which passes through the gap. Neither the source nor the measuring element needs to be in close proximity to the casting rolls. The signal from this measurement can then be used to adjust the roll gap to a desired value to obtain a desired gauge in the cast metal sheet. Such measurements complement torque and roll speed measurements set by the caster operator or subject to automatic control.

BRIEF DESCRIPTION OF THE DRAWINGS

FIG. 1 illustrates a fragmentary transverse cross section of the metal casting region in a roll caster;

FIG. 2 illustrates a monitoring mechanism in a transverse cross section of a roll caster;

FIG. 3 is a block diagram of a control system for a roll caster using voltages;

FIG. 4 is a block diagram of a digital control system for a roll caster; and

DETAILED DESCRIPTION

Figure 5:
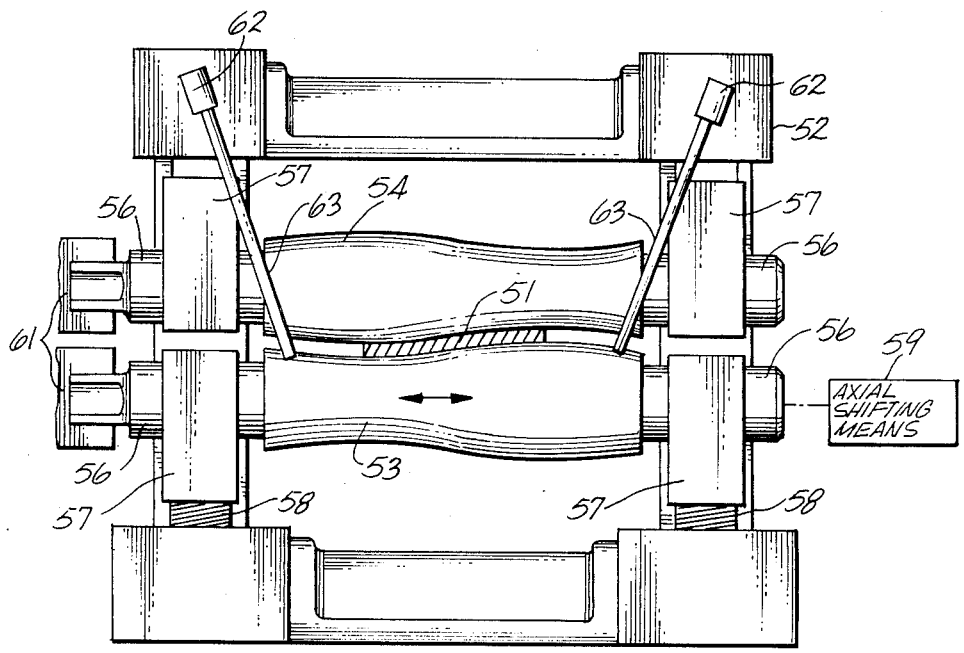
FIG. 5 is a face view of a roll caster with profile control as well as thickness control.

FIG. 1 illustrates in fragmentary transverse cross section a pair of water cooled rolls 10 of a continuous caster. Typically, the axes of the two rolls are parallel and horizontal, or they may be skewed somewhat. The rolls can be powered by any source. Preferably they are rotated independently by a pair of DC motors (not shown). They are driven in the direction of the movement of metal through the continuous caster (to the right in FIG. 1). The rolls are sometimes operated at slightly different speeds in order to compensate for a curved shape the casting might otherwise take because of different roll diameters.

Preferably, a molten metal feed tip 12 delivers molten aluminum 13 or the like into the bite toward the nip of the rolls. The nip is that location where the rolls are the closest together, sometimes referred to herein as the gap. The molten metal 18 emerges from the feed tip and increases in cross section to engage the surface of the rolls. The engagement with the cold roll surfaces provides for a high heat transfer rate, which initiates the freezing process. The heat is extracted from the molten metal by the casting rolls.

The rolls themselves are cooled, preferably by water passed through circumferential channels 14 between the core 8 and shell 9 of the rolls (FIG. 2), to provide a heat sink for the molten metal. The final freezing point of the metal is normally just before the nip of the casting rolls. The frozen metal sheet thus formed continues through the gap between the slowly rotating rolls and is reduced in thickness through hot working the metal for refining grain structure. A sheet of solid metal 15 leaves the rolls on the opposite side from the feed tip.

A more complete view of the roll caster is illustrated in FIG. 2. In an exemplary casting machine, the position of the lower roll is fixed by a set frame 16. The position of the upper roll is controlled by a conventional mechanical or hydraulic means 17. Alternatively, the upper roll may be fixed and the lower roll position controlled.

The gap between the rolls is monitored by the use of a collimated light beam. A light beam source such as a laser 18 transmits the light beam into the gap between the rolls. The light beam is directed by mirrors 19 or prisms for properly positioning the light beam in relation to the rolls. This increases the options of the user as to the relative positioning of the light source and the rolls. The more costly light source is preferably located in a position on the caster frame remote from the hostile environment of the roll gap, where it is safer from damage, while the less expensive mirrors are placed closer to the molten metal feed tip. Preferably the light beam enters the gap at an angle perpendicular to the roll axes, but a variety of angles can be used. In the ideal implementation, the light beam source is a laser or similar optical source which is nearly diffraction limited and stable.

The light beam is wider than the maximum gap between the rolls and is preferably centered equally between the rolls to assure accurate measurement of the gap width. If nothing else, some portion of each edge of the light beam should be occulted by one of the rolls. Since the original light beam is always larger than the gap, there will always be some part of the beam which is blocked by the rolls on either side of the gap. Naturally, the light beam is not directed between the casting rolls at the same place as the continuous metal casting. Preferably, light beams are directed between the rolls near each end so that the chock at each end can be independently controlled for maintaining uniform thickness of the sheet across its width.

After passing through the gap, the light beam is directed by mirrors or prisms 20 in the same way as the inlet beam. A photodetector 21 then intercepts the light beam which passes through the gap and measures it. In the simplest embodiment an analog measurement of the light intensity may be used. The measured value is directly proportional to the area of the light beam passing through the gap, and thus the width of the gap itself. The measured value is then compared to a previously selected value which is representative of the desired width of the gap and hence the thickness of the metal as it is cast. The exact form of the measured and selected values is unimportant, they can be voltages, currents, coded signals, or the like.

To assure an accurate measurement, a filter 28 can be used with the photodetector to reduce any reading of ambient light. With the use of a laser, which has substantially monochromatic light or at least a limited number of frequencies, the filtering is easily done by blocking all frequencies except for the operating frequency of the laser itself.

In an exemplary embodiment, the analog values are both voltages. An embodiment of the control system using voltage values is diagrammed in FIG. 3. The desired width of the gap may be set manually, using a dial or other selection device 30, or the width can be set automatically according to a selected program. The setting is translated into a voltage $V_1$, the value of which is a function of the desired gap width. The selected voltage becomes one input of a differential amplifier 31.

The detector of the light beam 21 comprises a photoelectric cell 32, which produces an electrical signal, the value of which is a function of the area of the light beam illuminating it. This value is translated into a voltage $V_2$, which is calibrated so that the voltage produced by the amount of light which passes through a gap of a given size is equal to the selected voltage produced when the selection device is set to that same size. Thus, if the desired size and the actual size are the same, there is no difference in the two voltages. In that case the output of the amplifier is zero.

Any difference in the voltages results in an output current from the amplifier 31. The current is used by the control circuit 33 for the movable roll. The control circuit uses the current to modify the position of the roll, if required, using conventional methods. One exemplary kind of mechanical control comprises a hydraulic system 34. In such a system, an error signal 35 from the control circuit activates the hydraulic actuator for changing the position of the upper roll. As the position of the roll changes, so does the gap width. As the gap width approaches the desired value, the voltages to the amplifier become equal, and the output of the amplifier goes to zero. The rolls are then held in that position.

Changes in the gap width are quickly sensed and responded to; the delay time in processing measurements is negligible. The prompt repositioning of the upper roll in near real time allows the control circuit to compensate for eccentricities in the rolls which may otherwise be manifested in cyclic thickness variations in the cast sheet.

With an analog measurement of the light beam through the gap between the rolls, shaping of the light beam for maximum sensitivity is desirable. For example, the beam may have an hour glass like shape so that there is a relatively small amount of light transmitted when the center of the beam passes between rolls which are close together, yet a considerably larger amount of light when the rolls are further apart. Other arrangements for obtaining a non-linear increase in light transmitted between the rolls may be used for enhancing sensitivity.

At the same time as measurements are made of cast metal thickness by measuring and controlling the width of the roll gap, torque on the motors rotating the rolls is monitored. Typically, the speed of the caster is set at a rate which achieves a desired productivity and quality of cast sheet. The torque is monitored by attention to the current required in the motors rotating the rolls. These can be controlled independently while the system for measuring and controlling roll gap assures that the cast metal remains within a specified tolerance. Separating force may also be measured for providing an indication of the locus of metal freezing.

Changes in the casting parameters indicated by such measurements may result in cast metal thickness variations. This system for controlling metal thickness at the roll gap itself assures that uniform thickness can be maintained despite changes in the other parameters. It is not necessary to employ complex interacting systems, although that is feasible, if desired.

The environment around the rolls of a casting machine is not conducive to accuracy of measurement of roll gap by optical means. Water vapor, steam, turbulent heated air, and other interfering substances in the air may commonly be found in the vicinity. For example, the rolls of a roll casting machine are commonly sprayed with a suspension of graphite in water to avoid sticking of the molten metal to the roll surface. The water flashes to steam and may interfere with the light beam passing through the roll gap.

Most of the potential for interference with the light beam can be ameliorated by directing the beam along an enclosed light path through tubes 22 between the light source and the detectors. The tubes can not be taken all the way to the faces of the rolls. Compressed clean air from blowers 23 or the like is therefore introduced through the tubes to be ejected into the roll gap. Sufficient air volume is introduced to keep extraneous substances out of the gap and avoid turbulence of air of different temperatures which could refract the beam and interfere with accurate measurements.

It is also desirable to provide means for removing graphite or the like from the surfaces of the rolls in the region where gap measurements are made. Thus, spring loaded scrapers 14, brushes, abrasive pads or the like are positioned to rub against the roll surfaces and keep them clean.

Another embodiment of a system for controlling cast metal thickness is diagrammed in FIG. 4. This is a digital instead of an analog implementation. The desired size of the gap is either chosen using a keyboard or other selection device 40, or automatically by a selected program. This selection is represented by a digital signal X, which corresponds to the desired width of the gap.

The light detector 21 comprises an array of photodetector cells 42 arranged so that the number of cells illuminated by the light passing through the gap between the rolls is a measure of the width of the gap. It is particularly desirable to employ charge coupled devices (CCDs) as the photodetectors since CCDs are available in very small size and sensitivity of the gap setting is a function of the size of the detectors. In such an embodiment, sensitivity of the gap measurement system can be enhanced by including a cylindrical lens or the like in the beam after passing through the gap so that the beam is broader and the incremental number of detectors illuminated is increased.

The exact response of the photodetection cells is of little concern, whether it be a change in electrical, magnetic, optical, or other properties. The necessary function of the detector is the production of a digital signal Y proportional to the number of cells which are struck by the light beam.

The light detector and the selection device are preset so that a given digital signal represents the same gap width for both the desired value and the measured value. A digital subtraction circuit 41 inputs the signals X and Y to produce the signal X-Y. This signal is entered into the control circuit 43 of the mechanical control of the upper roll. The control circuit uses this signal to make adjustments in the position of the upper roll using the mechanical control of the roll. Another exemplary mechanical roll control is a screw device 44, which raises or lowers the movable roll as the screw rotates. As the position of the roll changes, Y approaches X. When Y=X, X-Y=O and the roll is held in that position.

FIG. 5 illustrates the exit face of a continuous caster with an axially shiftable roll for simultaneously controlling both thickness and profile of a sheet 51 being cast. This two high roll stand has a rigid frame 52 carrying two non-cylindrical contoured working rolls 53 and 54 having necks 56 journalled in bearing blocks or chocks 57 which are mounted in the frame. In this machine the chocks for the lower roll 53 can be moved vertically relative to the chocks for the upper roll by standard adjustment screws 58. Further, the bearing chocks for the lower roll can be moved axially by means indicated schematically at 59 and more specifically described in U.S. Pat. Nos. 2,776,586, 3,857,268, 4,440,012, and 4,519,233, and German Patent Document No. 2,919,105, the subject matter of which is hereby incorporated by reference.

The rolls 53 and 54 have identical but oppositely oriented bottle-shaped bodies, each formed by rotation of a wholly curved generatrix about the respective axes of the rolls. The roll bodies therefore each have an outwardly convex half and an outwardly concave half forming a very slight S-shaped curve which is exaggerated for clarity in FIG. 5. Appropriate motor drives 61 are attached to the ends of each of the rolls for rotating them oppositely about their respective axes.

As described in detail in the above-mentioned patent documents which relate to rolling mills rather than continuous casters, the profile of the sheet 51 may be continuously varied from one that is crowned in the center to one that is thicker at the edges and thinner in the center, by axially shifting the lower movable roll.

A laser 62 or other source of collimated light is mounted at each end of the frame. Light from the laser passes through a tube 63 and is directed through the gap between the rolls. Clean air is blown through the tube as hereinabove described to provide a clean, enclosed light path. Light passing through the gap is detected by an array of photodetectors (not shown) mounted on the frame at the entrance face of the roll stand. By measuring the gap between the rolls at each end, the chocks for the movable roll can be independently controlled, for controlling the thickness of the sheet regardless of the axial shifting of the movable roll. Since the measurement technique does not contact any of the roll or chock surfaces, the gap measurement is independent of movement of the rolls.

The described embodiments are only meant as examples of different implementations. There are many other alternatives which fall within the spirit of this invention. For example, a wedge could be used to control the movement of the movable roll, moving it up and down as the wedge moves back and forth. The control device could be used to move either the upper or lower roll, or both. The rolls do not have to be in a vertical stack, the upper roll can be set back to form the casting at an upward angle, or the rolls can be side by side and form the casting vertically.

The illustrated casting machine is a "two high" machine with two working rolls, above and below the casting plane, respectively. The technique is equally applicable to a four high casting machine with a pair of working rolls and a pair of backup rolls behind the working rolls to provide added stiffness. The technique is also applicable to six high and cluster mills. Further, the technique is applicable to rolling mills which have axially shiftable rolls as well as to casting machines with such axially shiftable rolls.

The light beam itself does not have to be transmitted directly between the casting surfaces on the rolls, it could measure the gap between a pair of special gauge surfaces on the roll, or anything else that corresponds to the width of the gap between the rolls. It is definitely preferred to be transmitted between the actual roll surfaces, however, since other surfaces may not remain concentric with the roll surfaces. Further, the light source and photodetectors may be arranged on the same side of the rolls with a mirror on the opposite side to reflect the beam back through the gap.

Many other modifications and variations will be apparent to one skilled in the art, and it will therefore be understood that within the scope of the appended claims, the invention may be practiced otherwise than as specifically described.

What is claimed is:

1. A continuous caster with real time cast metal thickness control comprising:

two rotatable casting rolls arranged in parallel with a gap between them;

means for cooling said casting rolls for providing a heat sink;

means for delivering molten metal to the bite of said casting rolls for contact with the casting rolls for freezing the molten metal and producing a sheet of solid metal having a thickness corresponding to the gap between the casting rolls;

means for transmitting a beam of light into the gap between the rolls comprising a laser beam source;

a plurally of photodetector cells means for measuring the beam of light which passes through the gap;

means for selecting a value which is representative of a desired width of the gap;

comparator means for comparing the measured of the beam which passes through the gap with the selected value; and means for controlling the position of at least one of the casting rolls in response to the comparator means.

2. A continuous caster with real time cast metal thickness control comprising:

two rotatable casting rolls arranged in parallel with a gap between them;

means for cooling said casting rolls for providing a heat sink;

means for delivering molten metal to the bite of said casting rolls for contact with the casting rolls for freezing the molten metal and producing a sheet of solid metal having a thickness corresponding to the gap between the casting rolls;

a laser for transmitting a beam of light into the gap between the rolls;

photodetector means for measuring he beam of light which passes through the gap comprising a plurality of photodetector cells arranged so that the number of cells illuminated by the light passing through the gap between the rolls is a measure of the width of the gap;

means for selecting a value which is representative of a desired width of the gap;

comparator means for comparing the measurement of the beam which passes through the gap with the selected value; and means for controlling the position of at least one of the casting rolls in response to the comparator means.

3. A continuous caster with real time cast metal thickness control comprising:

two rotatable casting rolls arranged in parallel with a gap between them;

means for cooling said casting rolls for providing a heat sink;

means for delivering molten metal to the bite of said casting rolls for contact with the casting rolls for freezing the molten metal and producing a sheet of solid metal having a thickness corresponding to the gap between the casting rolls;

means for transmitting a beam of light into the gap between the rolls comprising a light source and an enclosed light path between the light source and the roll gap;

photodetector means for measuring the beam of light which passes through the gap and an enclosed light path between the roll gap and the photodetector means;

means for selecting a value which is representative of a desired width of the gap;

comparator means for comparing the measurement of the beam which passes through the gap with the selected value; and means for controlling the position of at least one of the casting rolls in response to the comparator means.

4. A continuous caster as recited in claim 3 further comprising means for blowing air through the enclosed light path into the gap between the rolls.

5. A continuous caster with real time cast metal thickness control comprising:

two rotatable casting rolls arranged in parallel with a gap between them;

means for cooling said casting rolls for providing a heat sink;

means for delivering molten metal to the bite of said casting rolls for contact with the casting rolls for freezing the molten metal and producing a sheet of solid metal having a thickness corresponding to the gap between the casting rolls;

means for transmitting a beam of substantially monochromatic light into the gap between the rolls;

photodetector means for measuring the beam of light which passes through the gap;

a filter in the light path to the photodetector means for rejecting light other than the monochromatic light;

means for selecting a value which is representative of a desired width of the gap;

comparator means for comparing the measurement of the beam which passes through the gap with the selected value; and means for controlling the position of at least one of the casting rolls in response to the comparator means.

6. A continuous with real time cast metal thickness control comprising:

two rotatable casting rolls arranged in parallel with a gap between them;

means for cooling said casting rolls for providing a heat sink;

means for delivering molten metal to the bite of said casting rolls for contact with the casting rolls for freezing the molten metal and producing a sheet of solid metal having a thickness corresponding to the gap between the casting rolls;

first means for transmitting a beam of light into the gap between the rolls;

first photodetector means for measuring the beam of light which passes through the gap;

means for selecting a value which is representative of a desired width of the gap;

comparator means for comparing the measurement of the beam which passes through the gap with the selected value;

means for controlling the position of at least one of the casting rolls in response to the comparator means;

means for shifting at least one of the rolls in an axial direction;

second means for transmitting a beam of light into the gap between the rolls; and second photodetector means for measuring the beam of light which passes through the gap at the opposite end of the roll gap from the first means for transmitting and first photodetector means.

7. A continuous caster with real time cast metal thickness control comprising:

two rotatable casting rolls arranged in parallel with a gap between them;

means for cooling said casting rolls for providing a heat sink;

means for delivering molten metal to the bite of said casting rolls for contact with the casting rolls for freezing the molten metal and producing a sheet of solid metal having a thickness corresponding to the gap between the casting rolls;

means for transmitting a beam of light into the gap between the rolls;

a photoelectric cell for measuring the beam of light which passes through the gap;

means for selecting a value which is representative of a desired width of the gap;

comparator means for comparing the measurement of the beam which passes through the gap with the selected value; and means for controlling the position of at least one of the casting rolls in response to the comparator means.

8. A continuous caster as recited in claim 7 wherein:

the measurement of the light beam is in the form of a voltage which is representative of the amount of light illuminating the photoelectric cell;

the selected value is a voltage;

the comparator means comprises a differential amplifier which uses the selected value and the measured voltage as inputs for producing an output proportional to the difference between them; and the means for controlling the casting roll position comprises a circuit which uses the output from the differential amplifier for adjusting the position of such a caster roll.

9. A continuous caster with real time cast metal thickness control comprising:

two rotatable casting rolls arranged in parallel with a gap between them;

means for cooling said casting rolls for providing a heat sink;

means for delivering molten metal to the bite of said casting rolls for contact with the casting rolls for freezing the molten metal and producing a sheet of solid metal having a thickness corresponding to the gap between the casting rolls;

means for transmitting a beam of light into the gap between the rolls;

an array of photodetector cells for measuring the beam of light which passes through the gap;

means or selecting a value which is representative of a desired width of the gap;

comparator means for comparing the measurement of the beam which passes through the gap with the selected value; and means for controlling the position of at least one of the casting rolls in response to the comparator means.

10. A continuous caster as recited in claim 9 wherein:

the measurement of the light beam is in the form of a digital signal which represents the number of photodetector cells illuminated by the beam of light passing through the gap;

the selected value is a digital signal;

the comparator means comprises a digital subtraction circuit which uses the measurement and the selected value as inputs for producing a signal representative of the difference between them; and the controlling means comprises a control circuit that uses the signal produced by the subtraction circuit for adjusting the position of such a caster roll.

11. A continuous caster comprising:

a frame;

a pair of work rolls mounted in the frame for rotation about parallel axes;

means for introducing molten metal into the bite of the rolls;

means for cooling the rolls for freezing metal in the bite before the nip between the rolls a light source;

an enclosed path for transmitting a beam of light from the light source into the gap between the rolls;

photodetector means for measuring the beam of light which passes through the gap;

an enclosed path between the gap between the rolls and the photodetector means; and means for controlling the width of the gap between the rolls in response to a signal from the photodetector means.

12. A continuous caster as recited in claim 11 further comprising means for blowing air through the enclosed path into the gap between the rolls.

13. A continuous caster as recited in claim 11 wherein the light source comprises a laser, and further comprising a filter in the light path to the photodetector means for rejecting light other than light from the laser 14. A continuous caster as recited in claim 11 further comprising means for shifting at least one of the rolls in an axial direction, and second means for transmitting a beam of light into the gap between the rolls and second photodetector means for measuring the beam of light which passes through the gap at the opposite end of the roll gap from the first mentioned means for transmitting and associated photodetector means.

15. A continuous caster as recited in claim 11 wherein the light source comprises a laser and the photodetector means comprises a plurality of photodetector cells arranged so that the number of cells illuminated by the light passing through the gap between the rolls is a measure of the width of the gap.

16. A method for continuously controlling the thickness of metal produced by a roll casting apparatus, comprising the steps of:

rotating the casting rolls;

cooling the casting rolls;

delivering molten metal to the bite of the casting rolls;

freezing the metal in the bite by sinking the heat into the casting rolls;

reducing thickness of the frozen metal by passing it through the gap between the casting tolls;

projecting a beam of light from a laser through the gap between the rolls during the freezing process;

measuring the amount of light which passes through the gap with an array of photodetector cells;

comparing the measurement of the light beam which passes through the gap with a selected value which is representative of the desired size of the gap between the casting rolls; and continuously controlling the width of the gap in response to the comparison.

17. A method as recited in claim 16 comprising directing the light through an enclosed path between the source of light and the roll gap, and between the roll gap and the means for measuring the amount of light.

18. A method as recited in claim 16 comprising blowing air through the enclosed path into the roll gap.

19. A method as recited in claim 16 comprising axially shifting at least one of the rolls for controlling the profile of metal being cast.

* * * * *